United States Patent
Li et al.

(10) Patent No.: US 8,054,785 B2
(45) Date of Patent: Nov. 8, 2011

(54) METHOD FOR ESTIMATING DIRECTION-OF-ARRIVAL OF TERMINAL IN MULTIPLE CO-FREQUENCY CELLS

(75) Inventors: Feng Li, Shanghai (CN); Guiliang Yang, Shanghai (CN); Nan Zhong, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 859 days.

(21) Appl. No.: 11/914,220

(22) PCT Filed: Apr. 30, 2006

(86) PCT No.: PCT/CN2006/000883
§ 371 (c)(1),
(2), (4) Date: May 2, 2008

(87) PCT Pub. No.: WO2006/119691
PCT Pub. Date: Nov. 16, 2006

(65) Prior Publication Data
US 2008/0310372 A1    Dec. 18, 2008

(51) Int. Cl.
*G01R 31/08* (2006.01)
*H04W 72/00* (2009.01)
(52) U.S. Cl. .................................. 370/329; 455/450
(58) Field of Classification Search ............... None
See application file for complete search history.

(56) References Cited

U.S. PATENT DOCUMENTS

| 6,064,338 | A | 5/2000 | Kobayakawa et al. |
| 7,103,537 | B2 * | 9/2006 | Witzgall et al. ............... 704/219 |
| 7,233,812 | B2 * | 6/2007 | Okawa et al. ............... 455/562.1 |

(Continued)

FOREIGN PATENT DOCUMENTS

CN    1388655 A    1/2003

(Continued)

OTHER PUBLICATIONS

Chinese Patent Office, First Office Action—Feb. 29, 2008, Application No. 2005100692272, 6 pages.

(Continued)

*Primary Examiner* — Hassan Phillips
*Assistant Examiner* — Eunsook Choi
(74) *Attorney, Agent, or Firm* — Haynes and Boone, LLP (57) ABSTRACT

The present invention discloses a method for estimating DOA of a terminal in multiple co-frequency cells, including the steps of: A. obtaining a channel estimation result of at least one terminal expecting a calculation of DOA in an expecting co-frequency cell; B. performing a Direction-of-Arrival estimation for the expecting terminal in the expecting cell based on the channel estimation result through a DOA estimating method with a wave beam scan, a DOA estimating method with a maximum power path, or a DOA estimating method with a primary eigenvector. With the channel estimations of the multiple cells in the invention, accurate channel estimation results of the respective cells may be provided, from which the channel estimation result of the expecting terminal is selected.

8 Claims, 5 Drawing Sheets

U.S. PATENT DOCUMENTS

| | | | |
|---|---|---|---|
| 2002/0082016 A1* | 6/2002 | Obayashi | 455/436 |
| 2002/0135516 A1* | 9/2002 | Sollenberger et al. | 342/387 |
| 2002/0176485 A1* | 11/2002 | Hudson | 375/144 |
| 2003/0169681 A1* | 9/2003 | Li et al. | 370/203 |
| 2004/0166901 A1* | 8/2004 | Umesh et al. | 455/561 |
| 2004/0185783 A1* | 9/2004 | Okawa et al. | 455/63.4 |
| 2004/0198386 A1* | 10/2004 | Dupray | 455/456.1 |
| 2004/0204098 A1* | 10/2004 | Owen | 455/561 |
| 2004/0204113 A1* | 10/2004 | Kisigami et al. | 455/562.1 |
| 2004/0235421 A1* | 11/2004 | Matsuoka et al. | 455/63.4 |
| 2005/0271016 A1* | 12/2005 | Kim et al. | 370/332 |
| 2009/0075645 A1* | 3/2009 | Karabinis | 455/422.1 |
| 2010/0238833 A1* | 9/2010 | Li et al. | 370/252 |

FOREIGN PATENT DOCUMENTS

| | | |
|---|---|---|
| CN | 1481100 | 3/2004 |
| CN | 1520077 | 8/2004 |
| CN | 1585318 | 2/2005 |
| CN | 1585318 A | 2/2005 |
| CN | 1595190 A | 11/2007 |
| EP | 1185004 A1 | 3/2002 |
| EP | 1235362 | 8/2002 |
| WO | 9745968 | 5/1997 |
| WO | WO 98/43459 | 10/1998 |
| WO | 2004066528 | 1/2004 |

OTHER PUBLICATIONS

International Searching Authority—P.R. China—The State Inellectual Property Office, International Search Report, International Application No. PCT/CN2006/000883, Jun. 23, 2006, 6 pages, Beijing, China.

European Patent Office, European Search Report dated Nov. 18, 2009, Application No. 06741782.4-220/1883176 PCT/CN2006000883, 10 pages.

Steiner, Bernd, and Paul Walter Baier, "Low Cost Channel Estimation in the Uplink Receiver of CDMA Mobile Radio Systems," report from the Lehrstuhl fur hochfrequente Signalubertragung und-verarbeitung der Universitat Kaiserslautern, 22113 Frequenz, 47(1003) Nov/Dez, No. 11/12, Berlin, DE, p. 292-298.

* cited by examiner

METHOD FOR ESTIMATING DIRECTION-OF-ARRIVAL OF TERMINAL IN MULTIPLE CO-FREQUENCY CELLS

CROSS-REFERENCE

This application is a United States national phase application of co-pending international patent application number PCT/CN2006/000883, filed Apr. 30, 2006, which claims priority to Chinese patent application number 2005/0069227.2, filed May 12, 2005, the disclosures of which are incorporated herein by reference.

FIELD OF THE INVENTION

The present invention relates to a method for estimating a Direction-of-Arrival in the field of communication technologies, and in particular to a method for estimating a Direction-of-Arrival of a terminal in multiple co-frequency cells, which is applicable to a wireless communication system of a slot Code Division Multiple Access system.

BACKGROUND OF THE INVENTION

In a Code Division Multiple Access (CDMA) mobile communication system, signals of multiple users are overlapped in the time and frequency domains, and the signals of the respective users upon reception have to be separated from each other with a signal separation method in the digital domain. In the case of co-frequency networking, there is serious multiple-access interference and intersymbol interference, and there is also relatively strong mutual interference between signals of co-frequency neighbor cells. In the prior art, a joint detection technology is used to eliminate the multiple-access interference and the intersymbol interference, in which the co-frequency interference is treated simply as part of background noise.

For a slot CDMA system using array antennas, since information provided from an interference signals of a co-frequency neighbor cell is not available, the co-frequency interference is treated simply as part of the background noise, thus a Direction-of-Arrival (DOA) estimation only for the local cell, i.e. a DOA estimation for a single cell at a single base station, can be performed, and DOA estimations for multiple co-frequency cells at a single base station can not be performed.

SUMMARY OF THE INVENTION

The present invention is intended to provide a method for estimating a DOA of any terminal in multiple co-frequency cells concurrently and precisely by a single base station, thus enabling the single base station to implement the DOA estimations of the multiple co-frequency cells.

The invention provides a method for estimating DOA of a terminal in multiple co-frequency cells, comprising the steps of:

A. obtaining a channel estimation result of at least one terminal expecting a calculation of DOA in an expecting co-frequency cell;

B. performing a Direction-of-Arrival estimation for the expecting terminal in the expecting cell based on the channel estimation result.

The channel estimation result is obtained through a method for estimating channels of multiple cells.

The Direction-of-Arrival estimation may be performed for the expecting terminal in the expecting cell based on the channel estimation result through a DOA estimating method with a wave beam scan.

The Direction-of-Arrival estimation for the expecting terminal in the expecting cell is performed through the steps of:

B11. calculating array response vectors of array antennas of a base station to be measured;

B12. calculating a space covariance matrix of the expecting terminal from the channel estimation result of the terminal;

B13. scanning the space covariance matrix of the expecting terminal with the array response vectors, and determining an angle of an array vector corresponding to a maximum power value as DOA of the expecting terminal.

The Direction-of-Arrival estimation may be performed for the expecting terminal in the expecting cell based on the channel estimation result through a DOA estimating method with a maximum power path.

The Direction-of-Arrival estimation for the expecting terminal in the expecting cell is performed through the steps of:

B21. calculating array response vectors of array antennas of a base station to be measured;

B22. performing a process in which only a maximum power path is retained, for the channel estimation result of the expecting terminal in the expecting cell;

B23. scanning, with the array response vectors, the channel estimation result of the expecting terminal after the process in which only a maximum power path is retained, and determining an angle of an array vector corresponding to a maximum power value as DOA of the expecting terminal in the expecting cell.

The Direction-of-Arrival estimation may be performed for the expecting terminal in the expecting cell based on the channel estimation result through a DOA estimating method with a primary eigenvector.

The Direction-of-Arrival estimation for the expecting terminal in the expecting cell is performed through the steps of:

B31. calculating array response vectors of array antennas of a base station to be measured;

B32. calculating a space covariance matrix of the expecting terminal from the channel estimation result of the terminal;

B33. solving a primary eigenvector of the space covariance matrix, which primary eigenvector is an eigenvector corresponding to a maximum eigenvalue;

B34. scanning the primary eigenvector of the space covariance matrix of the expecting terminal with the array response vectors, and determining an angle of an array vector corresponding to a maximum power value as DOA of the expecting terminal.

Channel estimations are performed through the steps of:

A1. estimating channels of multiple cells through a method for estimating channels of multiple cells, and obtaining channel estimation results of the multiple cells;

A2. selecting the channel estimation result of the expecting terminal in the expecting cell from the channel estimation results of the multiple cells.

The array response vectors are formed through discretizing a Uniform Circular Array or a uniform linear array into uniform angles.

The scanning is a one-time precise scanning or a hierarchically-approaching scanning.

The space covariance matrix is a Hermitian matrix.

A method for solving an eigenvector of the Hermitian matrix includes a power iteration algorithm, a QR decomposition algorithm, or a tri-diagonal algorithm.

The solving of the eigenvector of the Hermitian matrix through the power iteration algorithm includes:

assuming an initial value $u_0$ being an all-ones column vector, and substituting $u_0$ into the following formula (51):

$$v=Ru \quad (51)$$

obtaining and substituting v into the following formula (52):

$$b=v^H R v/\|v\|_2^2 \quad (52)$$

obtaining and substituting b into the following formula (53):

$$u=v/b \quad (53)$$

obtaining u, thereby finishing a first iteration; then substituting u into the formula (51), and obtaining new v; substituting the new v into the formula (52), and obtaining new b; and substituting the new b into the formula (53), and obtaining new u, thereby finishing a second iteration. Alike, any number of iterations can be performed. Upon satisfying a predetermined iteration condition, a primary eigenvalue of the matrix R is a real part of b, and a corresponding primary eigenvector is u, where $\|v\|_2$ is a 2 norm of a vector, and $v^H$ is a transposed matrix of v.

The predetermined iteration condition is that the iteration is terminated upon arriving at a threshold for the number of iterations; or during the iteration, the iteration is terminated when a difference of b between two consecutive iterations is below a threshold.

As compared with the prior art, the invention has the following advantages:

With the channel estimations of the multiple cells in the invention, accurate channel estimation results of the respective cells are provided, from which the channel estimation result of the expecting terminal is selected, thereby performing the precise DOA estimation based upon the channel estimation result of the expecting terminal. A major advantage of the invention is that it is possible to perform a DOA estimation of any terminal in multiple co-frequency cells at a single base station in a co-frequency networking slot CDMA system or a communication system using a similar signal structure, and is thus easy to locate any terminal in the multiple co-frequency cells at the single base station or locate precisely the terminal at multiple stations.

In the specific solutions of the invention, the precision DOA estimation can be performed based upon the channel estimation result of the expecting terminal through a DOA estimation method with a wave beam scan, a DOA estimation method with a maximum power path, or a DOA estimation method with a primary eigenvector.

DETAILED DESCRIPTIONS OF THE EMBODIMENTS

Preferred embodiments of the invention will be described in details hereinafter with reference to the drawings. It shall be noted firstly that terms and words used in the description as well as meanings of the claims shall not be taken as being limited to their literal and general significances only, but also convey meanings and concepts in compliance with the inventive technologies. This is in view of that the inventors shall give appropriate definitions of the terms to best describe the invention. Consequently, configurations presented in the description and the drawings are only preferred embodiments of the invention, but are not intended to enumerate all technical features of the invention. It shall be appreciated that there are various equivalent or modified solutions which can replace the preferred embodiments.

The invention can perform a DOA estimation of any terminal in multiple co-frequency cells at a single base station in a co-frequency networking slot CDMA system or a communication system using a similar signal structure, and thus obtain a Direction-of-Arrival of any terminal in multiple co-frequency neighbor cells at one base station through various approaches, thereby resulting in precise locating of the terminal.

Figure 1:
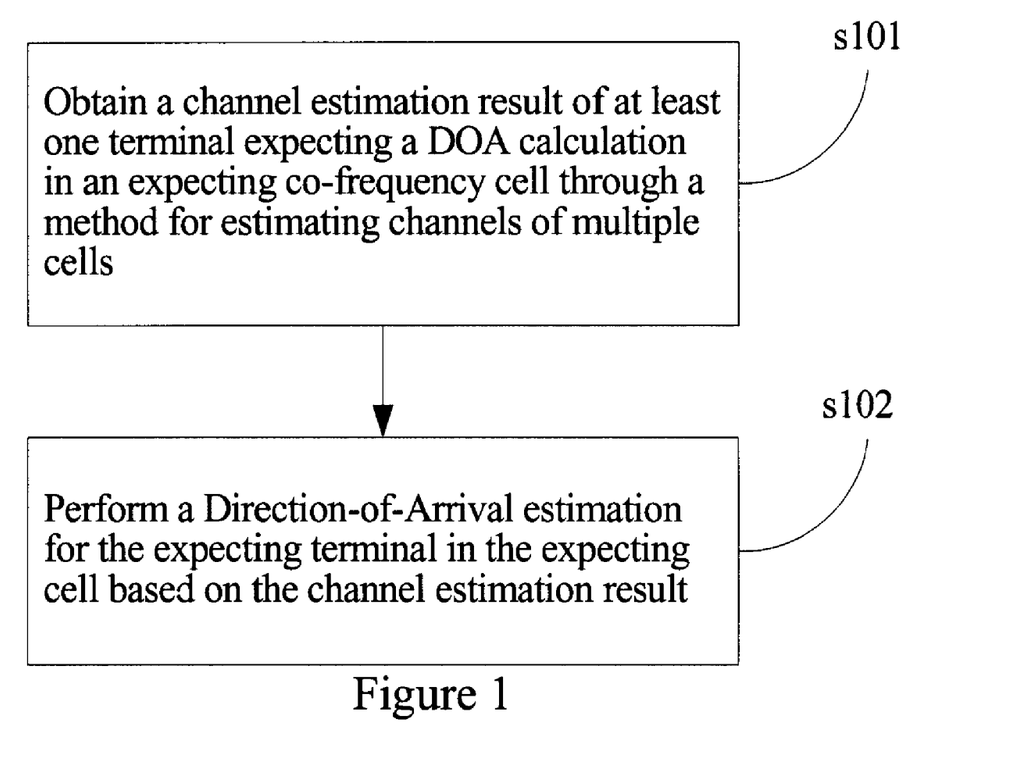
FIG. 1 is a flow chart of a general principle of a method for estimating a Direction-of-Arrival of a terminal in multiple co-frequency cells according to the invention.

A flow chart of a general principle of the invention is as illustrated in FIG. 1, including:

In a step s101, a channel estimation result is obtained for at least one terminal (including a mobile terminal or another terminal capable of wireless communication) expecting a DOA calculation in an expecting co-frequency cell through a method for estimating channels of multiple cells.

Firstly, the channel estimation is performed for the multiple cells simultaneously to obtain multiple corresponding channel estimation results, and then a channel estimation result of the expecting terminal in the expecting cell is selected from the multiple corresponding channel estimation results. The expecting cell is a cell where the Direction-of-Arrival estimation is expected for a terminal in the cell. There may be one or more expecting cells. Also, there may be one or more expecting terminals.

For a method for obtaining the above channel estimation results, a reference can be made to a method for channel estimation of multiple code sets that is disclosed in the Chinese Patent Application No. 03100670.1, entitled "Method for Channel Estimation of Multiple Code Sets in Slot Code Division Multiple Access System". In this method, when the slot CDMA system generates a channel estimation code, each neighbor cell defines a different Midamble as a basic code, and various users in the cell use different cyclic shift versions of the basic code as their channel estimation codes. Thus, the different cyclic shift versions of the cell can be referred to as a code set, and there are multiple code sets for multiple cells. Therefore, the channel estimations of the code sets are channel estimations of the multiple cells. Then, a finite-time decision process is performed on the channel estimation of one code set, and only a limited number of taps with a relatively strong signal response are retained. Thus, interference signals of other code sets are recovered and are counteracted, resulting in net signals of the respective code sets. Next, the channel estimation of one code set is performed on the net signals of the respective code sets. The above process is repeated until the number of iterations is reached, and then the channel estimation results of the multiple code sets, i.e., of the multiple cells, are output.

In a step s102, the Direction-of-Arrival estimation is performed for the expecting terminal in the expecting cell based on the channel estimation result. Specific DOA estimating methods includes: the Direction-of-Arrival estimation is performed for the expecting terminal in the expecting cell through a DOA estimating method with a wave beam scan; the Direction-of-Arrival estimation is performed for the expecting terminal in the expecting cell through a DOA estimating method with a maximum power path; the Direction-of-Arrival estimation is performed for the expecting terminal in the expecting cell through a DOA estimating method with a primary eigenvector, etc.

Figure 2:
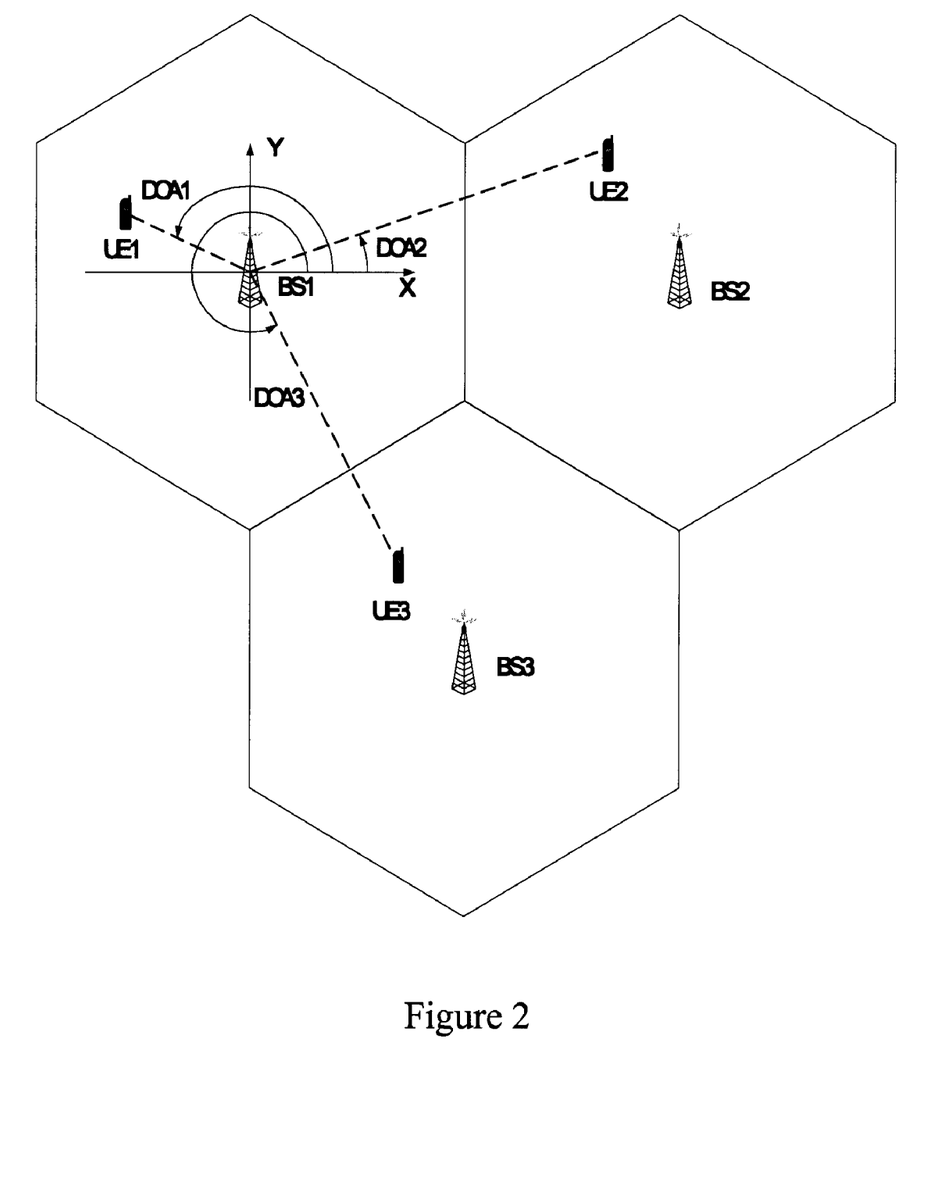
FIG. 2 is a structural diagram of a communication system in which an embodiment of the method for estimating a Direction-of-Arrival of a terminal in multiple co-frequency cells according to the invention is applied.

The invention will be described with reference to embodiments hereinafter. A wireless communication system as illustrated in FIG. 2 includes three co-frequency neighbor cells BS1, BS2 and BS3. In the cell BS1, there is a mobile terminal UE1 for which the DOA estimation is expected; in the cell BS2, there is a mobile terminal UE2 for which the DOA estimation is expected; and in the cell BS3, there is a mobile terminal UE3 for which the DOA estimation is expected. A method for implementing the invention will be described by way of an example in which BS1 performs concurrent DOA estimations of UE1, UE2 and UE3 to obtain DOA1, DOA2 and DOA3.

Figure 3:
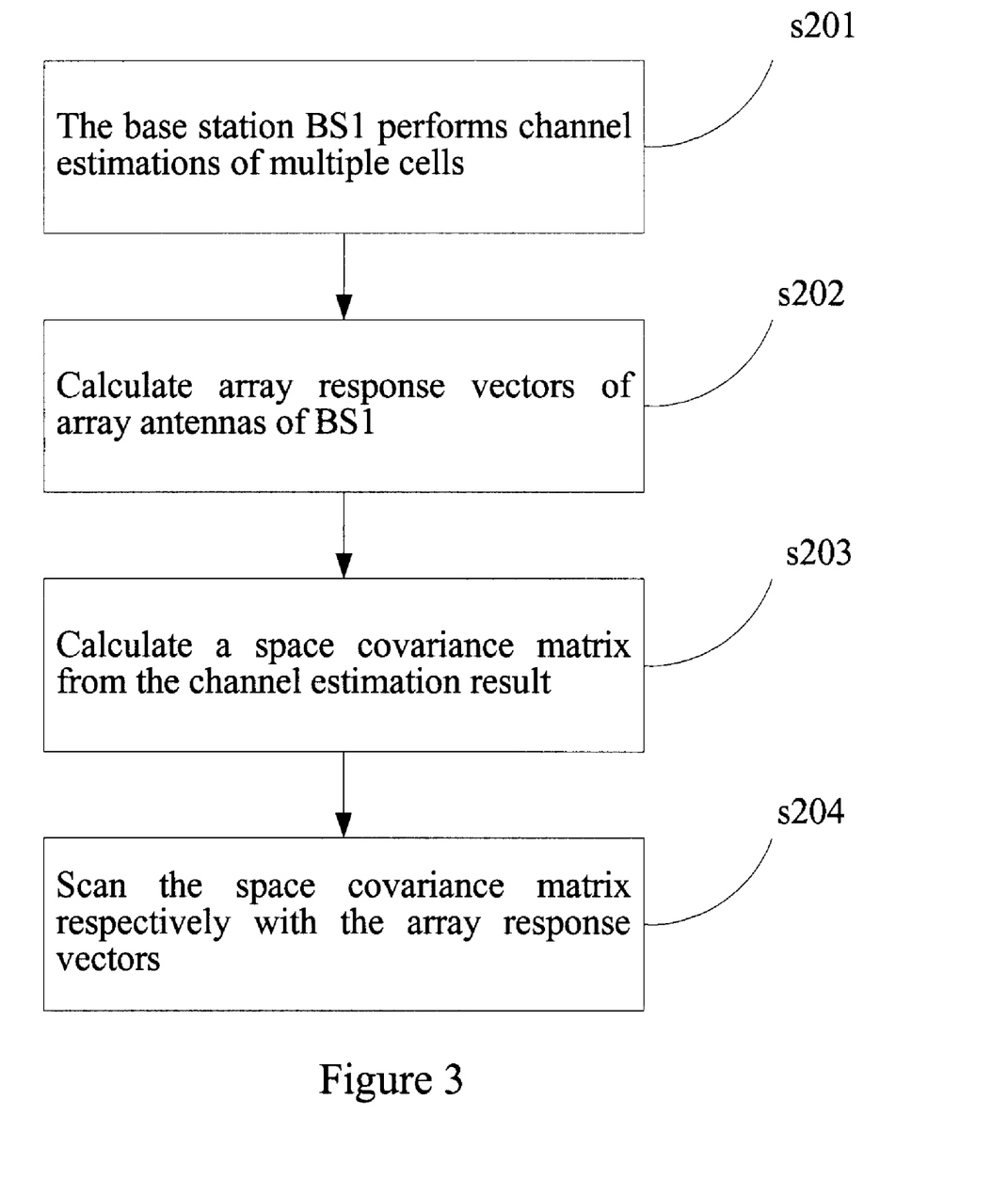
FIG. 3 is a flow chart of implementation of a first embodiment of the method for estimating a Direction-of-Arrival of a terminal in multiple co-frequency cells according to the invention.

A first embodiment of the invention is as illustrated in FIG. 3, including:

In a step s201, the base station BS1 performs channel estimations of multiple cells as in the step s101. For a specific method thereof, a reference can be made to the method in the Chinese Patent Application No. 03100670.1. Channel estimations $H_1$, $H_2$ and $H_3$ of cells where BS1, BS2 and BS3 are located are obtained respectively. The channel estimations $H_1$, $H_2$ and $H_3$ are matrixes of Ka*P dimensions, where Ka is the number of array antennas in a base station, and P is a total length of a cell channel estimation. Assume UE1 is the first user of BS1, UE2 is the second user of BS2, and UE3 is the third user of BS. Channel estimation results $H_1^{(1)}$, $H_2^{(2)}$ and $H_3^{(3)}$ ($H_n^j$, $n=1,2,3$, $j=1, 2, \ldots, J_n$ is of Ka*W dimensions, where W is a length of a channel estimation window of a terminal user) of UE1, UE2 and UE3 are extracted from $H_n$, $n=1,2,3$.

In a step s202, array response vectors of array antennas of BS1 are calculated. Assume BS1 is a Uniform Circular Array (UCA). With BS1 being a center, a space is discretized into numerous angles $\Omega = [\phi_1, \phi_2, \ldots, \phi_N]$, $$\Delta = \frac{2\pi}{N},$$

and thus corresponding N array response vectors $a(\phi_n)$, $n=1, \ldots N$ are obtained. For instance, if the space is divided equally into 360 intervals, then N=360, and $\Delta=1°$. Of course, BS1 can also be a uniform linear array.

In a step s203, space covariance matrixes $R_{xx1}^{(1)}$, $R_{xx2}^{(2)}$ 和 $R_{xx3}^{(3)}$ of UE1, UE2 and UE3 are calculated from the channel estimation results $H_1^{(1)}$, $H_2^{(2)}$ and $H_3^{(3)}$ of UE1, UE2 and UE3:

$R_{xx1}^{(1)} = H_1^{(1)} * H_1^{(1)H}$, $R_{xx1}^{(1)}$ is of Ka*Ka dimensions;

$R_{xx2}^{(2)} = H_2^{(2)} * H_2^{(2)H}$, $R_{xx2}^{(2)}$ is of Ka*Ka dimensions;

$R_{xx3}^{(3)} = H_3^{(3)} * H_3^{(3)H}$, $R_{xx3}^{(3)}$ is of Ka*Ka dimensions.

Where, $H_1^{(1)H}$ is a conjugate transposed matrix of $H_1^{(1)}$, and since $H_1^{(1)}$ is of Ka*W dimensions, $H_1^{(1)} * H_1^{(1)H}$ results in a matrix with Ka*Ka dimensions.

In a step s204, the space covariance matrixes of UE1, UE2 and UE3 are scanned respectively with the array response vectors. That is, a calculation is performed respectively for the corresponding space covariance matrixes with the above N array response vectors, and can be as illustrated in the followings formula (1) taking UE1 as an example.

$$P_{xx1}^{(1)}(\varphi) = \frac{a^H(\varphi) R_{xx1}^{(1)} a(\varphi)}{a^H(\varphi) a(\varphi)} \quad (1)$$

A power value $P_{xx1}^{(1)}(\phi)$ of the expecting terminal, which is corresponding to an angle $\phi$, is obtained. In this way, power values $P_{xx1}^{(1)}(\phi)$ of the expecting terminal, which are corresponding to all the N angles, are obtained. In the formula (1), the denominator is a normalizing factor, and $a^H(\phi)$ is a conjugate transpose of a ($\phi$).

The resultant power values $P_{xx1}^{(1)}(\phi), \phi \in [\phi_1, \phi_2, \ldots, \phi_N]$ at the N angles of the expecting terminal are compared to determine an angle of an array vector corresponding to a maximum power value as DOA1 of the expecting terminal, as depicted in the following formula (2).

$$DOA1 = \varphi = \underset{\varphi}{\mathrm{argmax}}(P_{xx1}^{(1)}(\varphi)), \varphi \in [\varphi_1, \varphi_2, \ldots, \varphi_N] \quad (2)$$

Alike, DOA2 of UE2, and DOA3 of UE3 can be obtained.

Further, the larger the value of N in the step 202 will be, the higher a precision of the DOA estimation will be in the case of a given estimation algorithm. Of course, a hierarchically-scanning method can also be used, in which firstly, a rough scan is performed with array vectors of a relatively small N value, determining a general scope of DOA, and then a fine scan is performed within the scope. In this way, it is possible to obtain optimal precision and calculation effort.

Figure 4:
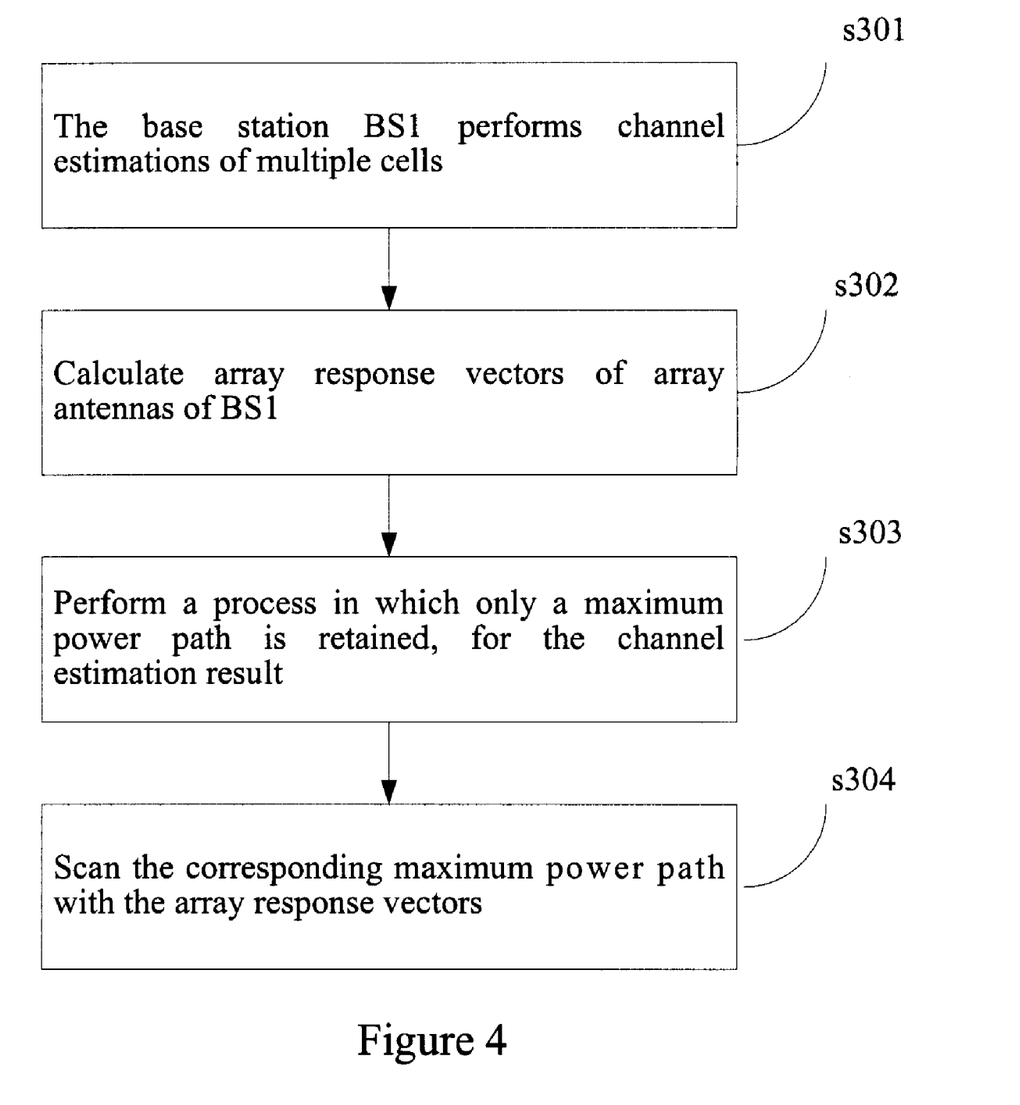
FIG. 4 is a flow chart of implementation of a second embodiment of the method for estimating a Direction-of-Arrival of a terminal in multiple co-frequency cells according to the invention.

A second embodiment of the invention is as illustrated in FIG. 4, including:

In a step s301, the base station BS1 performs channel estimations of multiple cells as in the step s101.

In a step s302, array response vectors of array antennas of the BS1 are calculated as in the step s202.

In a step s303, a process is performed for the channel estimations $H_1^{(1)}$, $H_2^{(2)}$ and $H_3^{(3)}$ of UE1, UE2 and UE3 in which only a maximum power path is retained, thus resulting in $H_1^{(1')}$, $H_2^{(2')}$ and $H_3^{(3')}$. Here, the process for $H_1^{(1)}$ in which only a maximum power path is retained will be described taking an example of an antenna array consisted of 8 antennas with a window length of 16. This antenna array is a complex matrix with the number of antennas being a row, and the window length being a column, i.e., a matrix of 8*16. Respective elements in the matrix are squared respectively and averaged as per line, thus resulting in 1*16 corresponding real numbers. A column in an original complex matrix corresponding to a maximum one of these real numbers is retained, and other columns are zeroed, thus resulting in a new matrix $H_1^{(1')}$ of 8*16. Alike, the process for $H_2^{(2)}$ in which only a maximum power path is retained can result in $H_2^{(2')}$, and the process for $H_3^{(3)}$ in which only a maximum power path is retained can result in $H_3^{(3')}$.

In a step s304, $H_1^{(1')}$, $H_2^{(2')}$ and $H_3^{(3')}$ are scanned with the array response vectors. That is, a calculation is performed respectively for the corresponding $H_1^{(1')} H_1^{(1')H}$, $H_2^{(2')} H_2^{(2')H}$ and $H_3^{(3')} H_3^{(3')H}$ with the above N array response vectors, where $H_i^{(i')H}$ is a conjugate transpose of $H_i^{(i')}$, $i=1,2,3$, and the calculation can be as illustrated in the following formula (3) taking UE1 as an example.

$$P_{xx1}^{(1)}(\varphi) = \frac{a^H(\varphi)H_1^{(1)'}H_1^{(1)'H}a(\varphi)}{a^H(\varphi)a(\varphi)} \quad (3)$$

A power value $P_{xx1}^{(1)}(\phi)$ of the expecting terminal, which is corresponding to an angle $\phi$, is obtained. In this way, power values $P_{xx1}^{(1)}(\phi)$ of the expecting terminal, which are corresponding to all the N angles, are obtained. The resultant power values $P_{xx1}^{(1)}(\phi)$, $\phi \in [\phi_1, \phi_2, \ldots, \phi_N]$ at the N angles of the expecting terminal are compared to determine an angle of an array vector corresponding to a maximum power value as DOA1 of the expecting terminal, as depicted in the following formula (4).

$$DOA1 = \varphi = \mathop{\mathrm{argmax}}_{\varphi}(P_{xx1}^{(1)}(\varphi)) \quad (4)$$

Alike, DOA2 of UE2 and DOA3 of UE3 can be obtained subsequent to obtaining DOA1 of UE1.

Figure 5:
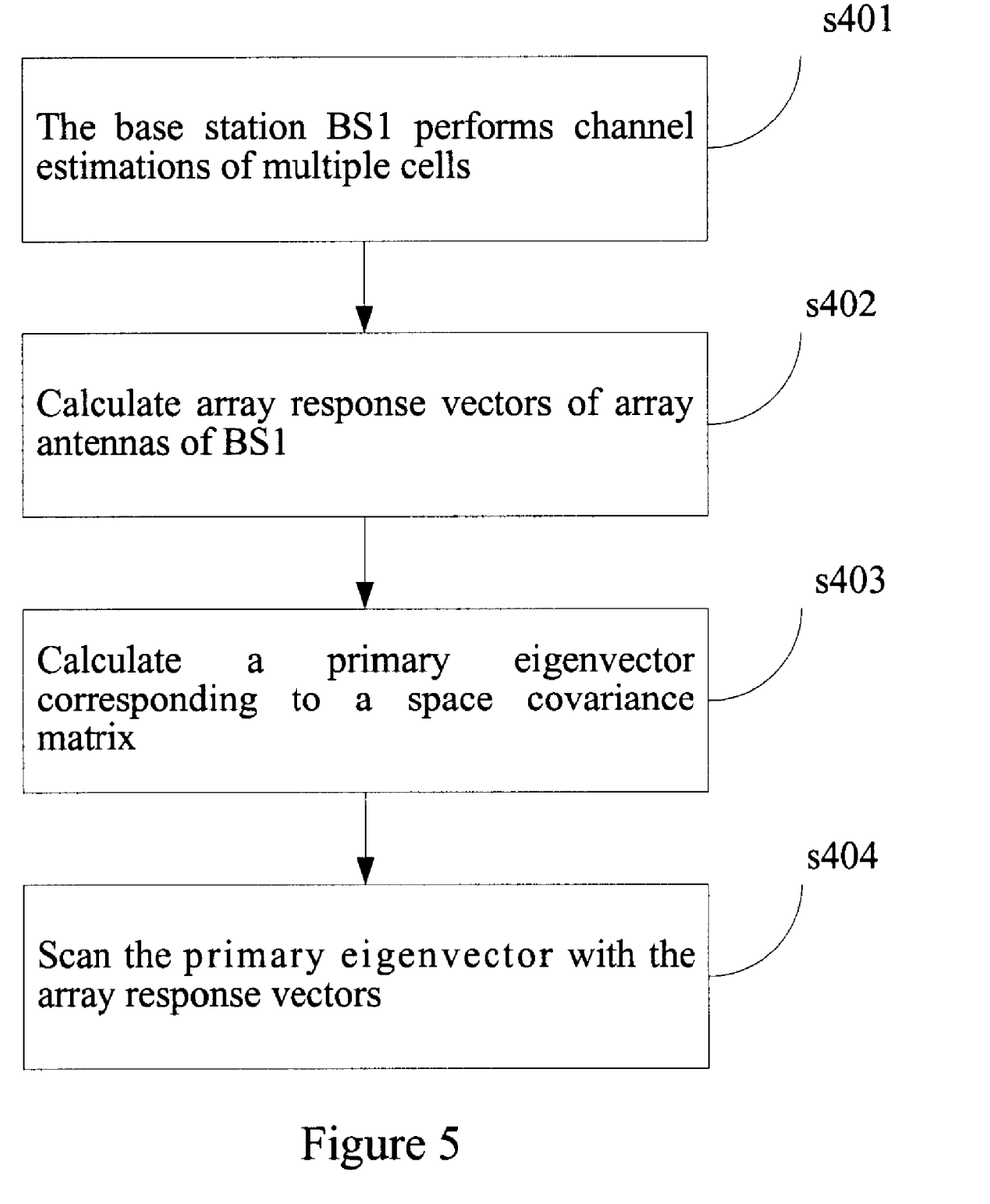
FIG. 5 is a flow chart of implementation of a third embodiment of the method for estimating a Direction-of-Arrival of a terminal in multiple co-frequency cells according to the invention.

A third embodiment of the invention is as illustrated in FIG. 5, including:

In a step s401, the base station BS1 performs channel estimations of multiple cells as in the step s101.

In a step s402, array response vectors of array antennas of the BS1 are calculated as in the step s202.

In a step s403, primary eigenvectors of space covariance matrixes $R_{xx1}^{(1)}$, $R_{xx2}^{(2)}$ and $R_{xx3}^{(3)}$ of UE1, UE2 and UE3, i.e., primary eigenvectors corresponding maximum eigenvalues, are solved, The space covariance matrix is Hermitian matrix, and an eigenvector of the Hermitian matrix can be solved with various algorithms, such as a power iteration algorithm, an orthogonal-triangular (QR) decomposition algorithm, a tridiagonal algorithm. The power iteration algorithm is a basic of various eigenvalue algorithms, and has a precision inferior to that of the QR decomposition algorithm and the like. However, the precision of the power iteration algorithm can satisfy a demand for the eigen DOA estimation. A specific procedure of the power iteration algorithm is as following.

Assume R is any of $R_{xx1}^{(1)}$, $R_{xx2}^{(2)}$ and $R_{xx3}^{(3)}$. Primary eigenvectors and primary eigenvalues of R can be obtained with the following iterations.

Assume an initial value $u_0$ is an all-ones column vector, for instance, and $u_0$ is substituted into the following formula (51):

$$v = Ru \quad (51)$$

The resultant v is substituted into the following formula (52):

$$b = v^H R v / \|v\|_2^2 \quad (52)$$

The resultant b is substituted into the following formula (53):

$$u = v/b \quad (53)$$

A first iteration is thus finished upon obtaining u. Again, u is substituted into the formula (51), and a new v is obtained; the new v is substituted into the formula (52), and a new b is obtained; and the new b is substituted into the formula (53), and a new u is obtained, thus finishing a second iteration. Alike, any number of iterations can be performed. A control on the number of iterations can be of various forms. In an example, a threshold for the number of iterations is preset dependent upon a practical condition prior to iteration, and upon arrival at the number, the iteration is terminated. In another example, a difference of b between two consecutive iterations will become smaller, and when the difference of b is below a threshold, the iteration is finished.

Here, $\|v\|_2$ indicates a 2 norm of a vector, i.e., energy of the vector.

Finally, upon satisfying an iteration condition, a primary eigenvalue $\lambda$ of the matrix R is a real part of b, as depicted in the following formula (61):

$$\lambda = \mathrm{real}(b) \quad (61)$$

And a primary eigenvector v corresponding to $\lambda$ is u, as depicted in the following formula (62):

$$v = u \quad (62)$$

Thus, primary eigenvectors of $R_{xx1}^{(1)}$, $R_{xx2}^{(2)}$ and $R_{xx3}^{(3)}$ are $v_1$, $v_2$ and $v_3$ respectively In a step s404, $v_1$, $v_2$ and $v_3$ are scanned with the array response vectors. That is, a calculation is performed respectively for the corresponding $v_1 v_1^H$, $v_2 v_2^H$ and $v_3 v_3^H$ with the above N array response vectors, where $v_i^H$ is a conjugate transpose of $v_i$, $i=1,2,3$, and the calculation can be as illustrated in the following formula (7) taking UE1 as an example.

$$P_{xx1}^{(1)}(\varphi) = \frac{a^H(\varphi)v_1 v_1^H a(\varphi)}{a^H(\varphi)a(\varphi)} \quad (7)$$

A power value $P_{xx1}^{(1)}(\phi)$ of the expecting terminal, which is corresponding to an angle $\phi$, is obtained. In this way, power values $P_{xx1}^{(1)}(\phi)$ of the expecting terminal, which are corresponding to all the N angles, are obtained. The resultant power values $P_{xx1}^{(1)}(\phi)$, $\phi \in [\phi_1, \phi_2, \ldots, \phi_N]$ at the N angles of the expecting terminal are compared to determine an angle of an array vector corresponding to a maximum power value as DOA1 of the expecting terminal, as depicted in the following formula (8).

$$DOA1 = \varphi = \mathop{\mathrm{argmax}}_{\varphi}(P_{xx1}^{(1)}(\varphi)) \quad (8)$$

Alike, DOA2 of UE2 and DOA3 of UE3 can be obtained subsequent to obtaining DOA1 of UE1.

The above disclosure is merely several embodiments of the invention, but the invention is not limited to these. Any variation which will occur to those skilled in the art shall fall within the claimed scope of the invention. For instance, the Direction-of-Arrival estimation can be performed for a terminal in multiple co-frequency cells which are not adjacent or not completely adjacent, where there may be multiple terminals in each of the cells. Further, a method for a Direction-of-Arrival estimation using other algorithm as taught in light the primary technical characters of the invention shall also be within the claimed scope of the invention.

What is claimed is:

1. A method for estimating DOA of a terminal in multiple co-frequency cells, comprising steps of:
   A. obtaining, by a Base Station in any cell of the multiple co-frequency cells, a channel estimation result of at least one terminal expecting a calculation of DOA in an expecting co-frequency cell, wherein the expecting co-frequency cell is a cell of the multiple co-frequency cells and the channel estimation result is obtained through a method for estimating channels of multiple cells;
   B. performing, by the Base Station, Direction-of-Arrival estimation for the expecting terminal in the expecting cell based on the channel estimation result;
   wherein
   in the step B, the Direction-of-Arrival estimation is performed for the expecting terminal in the expecting cell based on the channel estimation result through a DOA estimating method with a wave beam scan, and the performing of the Direction-of-Arrival estimation for the expecting terminal in the expecting cell in the step B comprises: B11. calculating, by the Base Station, array response vectors of array antennas of a base station to be measured; B12. calculating, by the Base Station, a space covariance matrix of the expecting terminal from the channel estimation result of the terminal; B13. scanning, by the Base Station, the space covariance matrix of the expecting terminal with the array response vectors, and determining an angle of an array vector corresponding to a maximum power value as DOA of the expecting terminal; wherein the space covariance matrix is a Hermitian matrix and a method for solving an eigenvector of the Hermitian matrix comprises a power iteration algorithm, an orthogonal-triangular, QR, decomposition algorithm, or a tri-diagonal algorithm;

or in the step B, the Direction-of-Arrival estimation is performed for the expecting terminal in the expecting cell based on the channel estimation result through a DOA estimating method with a primary eigenvector, and the performing of the Direction-of-Arrival estimation for the expecting terminal in the expecting cell in the step B comprises: B31. calculating, by the Base Station, array response vectors of array antennas of a base station to be measured; B32. calculating, by the Base Station, a space covariance matrix of the expecting terminal form the channel estimation result of the terminal; B33. solving, by the Base Station, a primary eigenvector of the space covariance matrix, which is an eigenvector corresponding to a maximum eigenvalue; B34. scanning, by the Base Station, the primary eigenvector of the space covariance matrix of the expecting terminal with the array response vectors, and determining an angle of an array vector corresponding to a maximum power value as DOA of the expecting terminal; wherein the space covariance matrix is a Hermitian matrix and a method for solving an eigenvector of the Hermitian matrix comprises a power iteration algorithm, an orthogonal-triangular, QR, decomposition algorithm, or a tri-diagonal algorithm.

2. The method for estimating DOA of a terminal in multiple co-frequency cells according to claim 1, wherein the channel estimation result is obtained through a method for estimating channels of multiple cells in the step A with processes of:

A1. estimating, by the Base Station, channels of the multiple cells through the method for estimating channels of multiple cells, and obtaining channel estimation results of the multiple cells;

A2. selecting, by the Base Station, the channel estimation result of the expecting terminal in the expecting cell from the channel estimation results of the multiple cells.

3. The method for estimating DOA of a terminal in multiple co-frequency cells according to claim 1, wherein the array response vectors are formed through discretizing a Uniform Circular Array or a uniform linear array into uniform angles.

4. The method for estimating DOA of a terminal in multiple co-frequency cells according to claim 1, wherein the scanning is a one-time precise scanning or a hierarchically-approaching scanning.

5. The method for estimating DOA of a terminal in multiple co-frequency cells according to claim 1, wherein the solving of the eigenvector of the Hermitian matrix through the power iteration algorithm comprises:

assuming an initial value $u_0$ being an all-ones column vector, and substituting $u_0$ into the following formula (51):

$$v = Ru \quad (51)$$

obtaining and substituting v into the following formula (52):

$$b = v^H Rv / \|v\|_2^2 \quad (52)$$

obtaining and substituting b into the following formula (53):

$$u = v/b \quad (53)$$

obtaining u, thereby finishing a first iteration; then substituting u into the formula (51), and obtaining new v; substituting the new v into the formula (52), and obtaining new b; and substituting the resultant b into the formula (53), and obtaining new u, thereby finishing a second iteration; and performing multiple iterations in the same way; and upon satisfying a predetermined iteration condition, a primary eigenvalue of the matrix R is a real part of b, and a corresponding primary eigenvector is u, wherein $\|v\|_2$ is a 2 norm of a vector, and $v^H$ is a transposed matrix of v.

6. The method for estimating DOA of a terminal in multiple co-frequency cells according to claim 5, wherein the predetermined iteration condition is that the iteration is terminated upon arrival at a threshold for the number of iterations; or during the iteration, the iteration is terminated when a difference of b between two consecutive iterations is below a threshold.

7. The method for estimating DOA of a terminal in multiple co-frequency cells according to claim 1, wherein the solving of the eigenvector of the Hermitian matrix through the power iteration algorithm comprises:

assuming an initial value $u_0$ being an all-ones column vector, and substituting $u_0$ into the following formula (51):

$$v = Ru \quad (51)$$

obtaining and substituting v into the following formula (52):

$$b = v^H Rv / \|v\|_2^2 \quad (52)$$

obtaining and substituting b into the following formula (53):

$$u = v/b \quad (53)$$

obtaining u, thereby finishing a first iteration; then substituting u into the formula (51), and obtaining new v; substituting the new v into the formula (52), and obtaining new b; and substituting the resultant b into the formula (53), and obtaining new u, thereby finishing a second iteration; and performing multiple iterations in the same way; and upon satisfying a predetermined iteration condition, a primary eigenvalue of the matrix R is a real part of b, and a corresponding primary eigenvector is u, wherein $\|v\|_2$ is a 2 norm of a vector, and $v^H$ is a transposed matrix of v.

8. The method for estimating DOA of a terminal in multiple co-frequency cells according to claim 7, wherein the predetermined iteration condition is that the iteration is terminated upon arrival at a threshold for the number of iterations; or during the iteration, the iteration is terminated when a difference of b between two consecutive iterations is below a threshold.

* * * * *